United States Patent [19]
Yammine et al.

[11] Patent Number: 5,564,011
[45] Date of Patent: Oct. 8, 1996

[54] SYSTEM AND METHOD FOR MAINTAINING FILE DATA ACCESS IN CASE OF DYNAMIC CRITICAL SECTOR FAILURE

[75] Inventors: Ghassan A. Yammine, Pflugerville; Gregory L. Morris, Round Rock, both of Tex.

[73] Assignee: International Business Machines Corporation, Armonk, N.Y.

[21] Appl. No.: 425,722

[22] Filed: Apr. 20, 1995

Related U.S. Application Data

[63] Continuation of Ser. No. 132,010, Oct. 5, 1993, abandoned.

[51] Int. Cl.$^6$ .................................................. G06F 11/34
[52] U.S. Cl. ................................. 395/182.13; 395/182.06; 364/246.3; 364/DIG. 1
[58] Field of Search ......................... 395/182.02, 182.06, 395/182.09, 182.11, 182.13, 180, 181; 371/10.2, 20.1, 40.1, 51.1; 364/245.2, 245.3, 246.3

[56] References Cited

U.S. PATENT DOCUMENTS

| | | | |
|---|---|---|---|
| 4,152,695 | 5/1979 | Democrate et al. | 371/38.1 |
| 4,405,952 | 9/1983 | Slakmon | 360/49 |
| 4,434,487 | 2/1984 | Rubinson et al. | 371/10.1 |
| 4,498,146 | 2/1985 | Martinez | 371/10.1 |
| 4,525,839 | 6/1985 | Nozawa et al. | 371/38.1 |
| 4,611,314 | 9/1986 | Ogata et al. | 369/32 |
| 4,631,723 | 12/1986 | Rathbun et al. | 371/10.1 |
| 4,674,038 | 6/1987 | Brelsford et al. | 371/20.1 |
| 4,742,447 | 5/1988 | Duvall et al. | 364/200 |
| 4,796,113 | 1/1989 | Hayakawa | 371/10.1 |
| 4,903,198 | 2/1990 | Iwasaki | 364/200 |
| 5,105,427 | 4/1992 | Ando | 371/40.1 |
| 5,210,866 | 5/1993 | Milligan et al. | 395/575 |
| 5,258,984 | 11/1993 | Menon et al. | 371/10.1 |
| 5,271,012 | 12/1993 | Blaum et al. | 371/10.1 |
| 5,271,018 | 12/1993 | Chan | 371/10.2 |
| 5,283,790 | 2/1994 | Kawashita | 371/10.1 |

*Primary Examiner*—Robert W. Beausoliel, Jr.
*Assistant Examiner*—Albert Décady
*Attorney, Agent, or Firm*—Jeffrey S. LaBaw; Andrew J. Dillon

[57] ABSTRACT

A system and method for regeneration of certain on disk dynamic control blocks for the file system after failure of access to the control blocks improves auxiliary disk storage system robustness. Regeneration of the dynamic control blocks is achieved without persistent replicas of the blocks on disk and thereby adheres to prior art disk formats. The regeneration control blocks are preferably used to support file system operation during backup of the disk, since loss of access to critical sectors for storing control blocks may portend disk storage system failure.

26 Claims, 7 Drawing Sheets

- SIGNATURES
- CLEANLINESS FLAG (SPB)
- POINTER TO HOT FIX LIST
- NUMBER OF HOT FIXES IN EFFECT
- MAXIMUM SIZE OF HOT FIX LIST
- POINTER TO SPARE BLOCK DIRECTORY
- COUNTER FOR NUMBER USED

SPARE BLOCK

*Fig. 5A*

- COPY OF SPB FLAG
- POINTER TO HOT FIX LIST
- COUNT OF HOT FIXES IN EFFECT
- MAXIMUM ALLOWED HOT FIXES
- POINTER TO SPARE DIRECTORY BLOCKS
- SECTOR NUMBER FOR SPARE BLOCK
- HOT FIX LIST
- POINTER TO ROOT FNODE

VOLUME TABLE

*Fig. 5B*

SYSTEM AND METHOD FOR MAINTAINING FILE DATA ACCESS IN CASE OF DYNAMIC CRITICAL SECTOR FAILURE

This is a continuation, of application Ser. No. 08/132,010, filed 05 Oct. 1993, now abandoned.

BACKGROUND OF THE INVENTION

1. Technical Field

The invention relates to input and output management on data processing systems and more particularly to a robust high performance file system for managing auxiliary disk storage systems.

2. Description of the Related Art

Physical storage of data on a mass storage device which is an auxiliary of a host computer or file server depends on the physical organization of the storage device. Within a computer, data are organized logically as files. A file system maps the file onto the mass storage device, allowing the file to be stored to a device and later accessed from the device for purposes of modification, destruction, or other manipulation. Aspects enhancing the robustness of such mapping, particularly as it applies to disk drives, are dealt with here.

File systems for disk drives are among the more visible aspects of computer operating systems from a user's perspective. Those familiar with the command line interface of the venerable Disk Operating System (DOS) will recognize the pathnames used in that system as strings of names for directories ending in the name of a desired file. The pathname describes the location of a file in the multiple level tree structured directory based on a root directory used by DOS, as well as by the UNIX and OS/2 operating systems.

The two primary objects of file systems are files and directories. User and program data are always placed in files. Directories own files and other directories and provide a vehicle for locating records of a file stored on disk. A file manifests itself on a disk drive as one or more physical records of data and a record for storing a control structure. Directories include a record for storing a control structure. In the High Performance File System (HPFS) provided with the OS/2 operating system, available from International Business Machines Corporation, these control structure records are called FNODES. FNODES are similar in concept to the familiar INODES employed by various versions of the UNIX operating system. On access to an FNODE the file system can recover items such as an access control list, extended attributes, pointers to the records of data for the file (if for a file) and a back pointer to a parent directory (unless the FNODE is for the root directory).

Implementing a file system also requires certain general control structures. Some of these control structures are generated upon mounting of a disk with the initial program load (a/k/a boot) of the operating system. Other control structures are resident on disk and so survive shutdown of the disk drive and the data processing system.

Four major control structures are stored on disk in the HPFS. The first of these is the Superblock, a static structure on a formatted disk permanently stored at sector 16. The most pertinent feature of the Superblock is a pointer to the FNODE for the root directory. Another structure is the Spareblock, which is a dynamic structure permanently stored at sector 17 of a disk. The Spareblock has been used for storing information relating to the HotFix List and the Spare Directory Block (SpareDirBlk). The HotFix List is a map of good reserved sectors which may be substituted on the fly for bad sectors. Once a HotFix List sector is so substituted the HotFix List functions as a map from the bad sector to the substituted good sector. The Spare Directory Block is a list of groups of adjacent sectors which may be used for creation of directories in case of shortage of space for that purpose on the disk.

The data of the Spareblock and HotFix List are critical to operation of the HPFS. The sectors in which the Spareblock and HotFix List are located are termed critical sectors. The formats for file systems for most versions of UNIX, among other operating systems, replicate data from critical sectors at one or more places on the disk. As long as these critical sectors are static (i.e., their contents do not change over time), the replication does not incur input/output overhead. If the critical sectors are dynamic, then input/output overhead and other complexities are incurred if dynamic updating is used. Multiple sector writes must be done (one for each replica) and a mechanism for resolving which replica to trust must be employed in order to handle the possibility of failure to one or more replicas. Some file systems opt for performance through not replicating dynamic critical sectors. HPFS is an example of such a file system and its Spareblock sector is an example of one of its dynamic critical sectors. However, the absence of replicated critical sectors leaves these file systems more vulnerable to disk wear and failure than other file systems. Thus it would be advantageous to these file systems to provide some technique other than routine replication of critical sectors for improving robustness.

SUMMARY OF THE INVENTION

It is an object of the invention to provide a system and method for input and output management for a data processing system.

It is another object of the invention to provide a system and method for managing a robust file system for an auxiliary disk storage system.

It is still another object of the invention to provide a system and method for regeneration of certain critical control blocks after failure to access the control blocks for a file system not permitting concurrent redundant copies of the control blocks while adhering to a preexisting disk format and thereby avoiding loss of backwards compatibility.

It is yet another object of the invention to provide a system and method for maintaining access to information on a disk after failure to access certain dynamic control block stored on critical sectors.

It is an object of the invention to notify a user of possible failure of a disk drive after failure to access the control blocks for the file system to allow the user to back up the data residing on the disk.

It is another object of the invention to provide a system and method for ensuring that after failure to access the control blocks, file updates are written in a synchronous manner.

The invention provides for the above and other objects in a file system driver that dynamically updates certain critical sectors during operation. All file system disk formats expect critical information to reside at predetermined locations on a disk. Without successful access to this critical information, file system drivers cannot provide file access to applications. Some disk formats specify the critical sectors for dynamic update. These critical sectors are not replicated on disk because of the maintenance overhead. Consequently, if the file system driver fails to access any of these critical sectors then loss of data occurs and the data residing on disk is placed in an inconsistent state. Increased robustness is provided here for such disk formats by triggering regeneration of the contents of these critical sectors when access to the original locations fails.

Upon file system initialization, the file system driver reads certain dynamically updated critical sectors residing at predetermined, unique locations on disk. The file system driver keeps in its own memory space enough information to enable it to at least partially recreate these critical sectors. During normal operation, the file system driver updates the critical sectors to reflect changes in the state in the disk. If access to one of these critical sectors then fails, the file system recreates a memory image of the sector from the data gathered at file system initialization including any updated changes. Once the image is recreated, the file system driver writes the image to a location different than the original location. As applicable, all pointers to the original sector are redirected to the new location. A message is generated to alert a user as to the state of the disk drive with recommendation that the data on the disk drive be backed up. The file system remains otherwise fully operational.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 5A and 5B depict fields within a Spareblock and in a volume table for a file system.

DETAILED DESCRIPTION OF THE INVENTION

Figure 1:
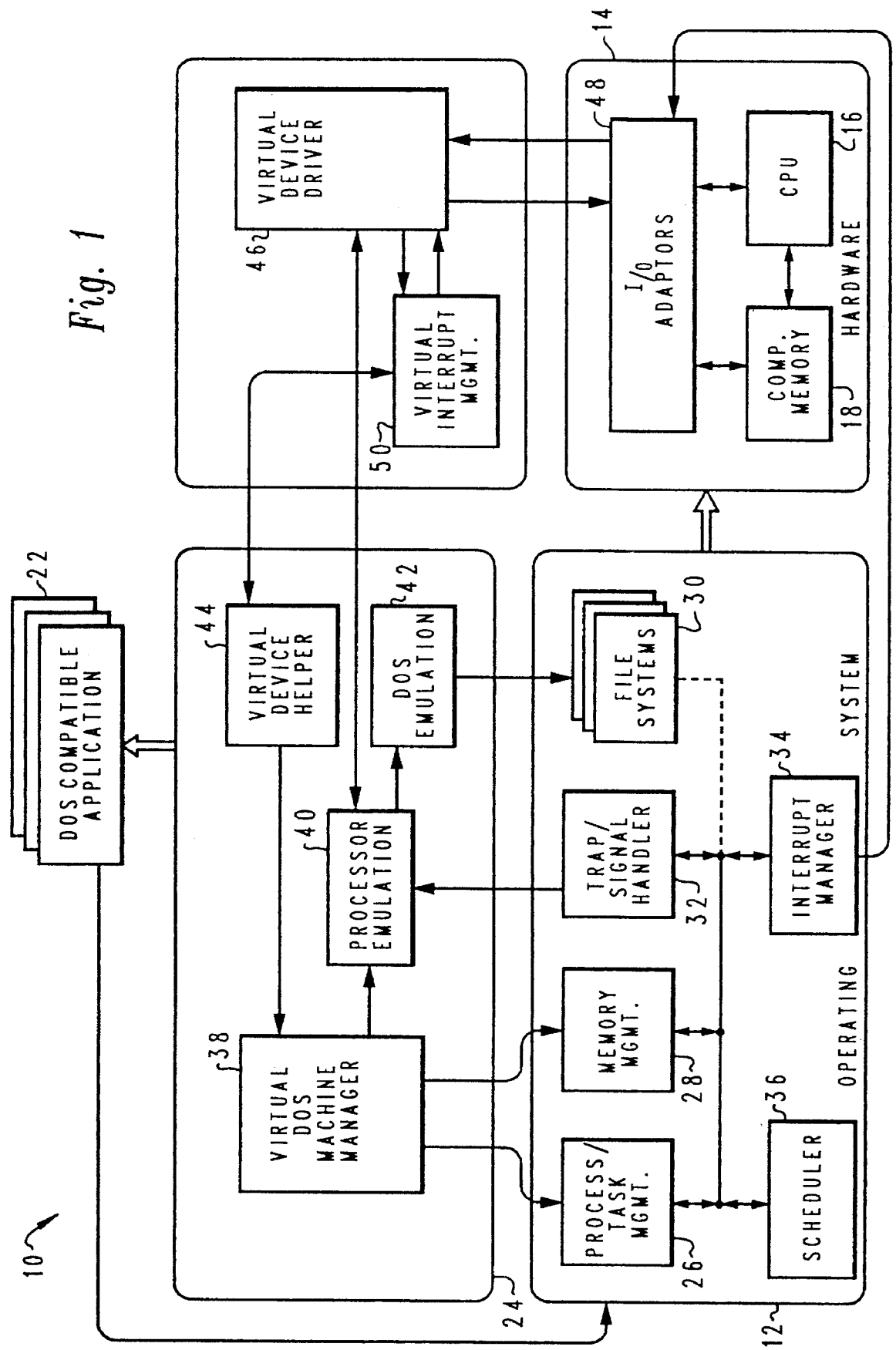
FIG. 1 a high level block diagram of the software and hardware components of a data processing system which may be utilized to implement the method and system of the present invention.

With reference now to the figures and in particular with reference to FIG. 1, there is depicted a high level block diagram illustrating software and hardware components of a data processing system 10 which may be utilized to implement the method and system of the present invention. Data processing system 10 includes an operating system kernel 12 which resides in a hardware system 14. The operating system is preferably provided by the OS/2 operating system, version 2.0 or later, available from International Business Machines Corporation. Hardware system 14 includes at minimum a central processing unit (CPU) 16 and a computer memory 18. CPU 16 is preferably an Intel 80386 or 80486 microprocessor or their equivalent. Hardware system 14 further preferably includes input/output adapters 20. The depiction of operating system 12 is simplified for the sake of clarity and is directed to a personal computer. However, those skilled in the art will recognize that data processing system 10 with minor modification may function as a file server for a network.

Also depicted in FIG. 1 are user applications 22 which access selected procedures within one of a plurality virtual DOS machines 24 in which the particular application is running, and which may access selected procedures within operating system kernel 12. As is typical in such systems, selected procedures within operating system kernel 12 are designed to be called or invoked by applications within virtual DOS machines 24 through the VDM. Thereafter the task will return to the user program which invoked the operating system kernel procedure. In this manner, operating system kernel 12 acts as an interface between the user of data processing system 10 and hardware system 14. User applications 22 are frequently the source of file descriptors passed to operating system kernel 12, through virtual DOS machines 24 or by direct calls.

Operating system kernel 12 is utilized to provide an environment in which various processes such as Virtual DOS machines 24 may be executed. Operating system kernel 12 provides for the efficient utilization of and prevents processes from interfering with the proper operation of data processing system 10 by controlling the creation and alteration of files, the control of input/output devices and the provision of multiple device drivers which permits data processing system 10 to interface with various external devices. More particularly, operating system 12 provides for multitasking thereby permitting a plurality of concurrent virtual DOS emulations to occur. Each virtual DOS machine 24 is a process.

Still referring to FIG. 1, it may be seen that operating system kernel 12 includes multiple subsystems, including process/task management system 26 which is utilized to provide task creation, deletion, status and synchronization functions. Control of the status of tasks from a process, which are running, ready to run, or not ready to run, is essential for scheduling of tasks for CPU 16. Next, memory management system 28 is depicted. Memory management system 28 allocates and deallocates portions of computer memory 18 for data processing system 10. This is an essential for any system utilizing virtual storage, as do each virtual DOS machine 24 supported by system 10.

File systems 30 primarily concern management of auxiliary storage. A file is a named set of records stored or processed as a unit by a data processing system, such as a process. A file system provides for user and system manipulation of a file including their creation, destruction and modification. Another aspect of files typically addressed within an operating system kernel is control of access to the files. Access control is utilized to ensure that an access to a file or directory is checked for correctness. In the OS/2 operating system file systems are installable, meaning that more than one file system may be used. If different types of auxiliary storage are used, e.g. disk drives and CD-ROMs, almost certainly more than one file system is used. In an OS/2 based system utilized in a network file server at least two file systems are provided for use with disk drives: (1) the File Allocation Table (FAT) system which is compatible with DOS; and (2) HPFS386. HPFS386 is network optimized file system utilizing the disk format structure for HPFS.

Trap and signal handler 32 is also depicted within operating system kernel 12 and is utilized to respond to traps and signals typically activated by hardware system 14. Among the signals generated by hardware 14 are page fault signals, indicating operations relating to computer memory 22 and auxiliary memory accessed through I/O adapters 48. Such page fault signals are subdivided into two categories corresponding to the type of memory being accessed. Page reclaim operations relate to a memory paging operation limited to computer memory 18. A page fault requiring I/O operations is the second category.

Interrupt manager 34 preferably manages interrupt handlers which are set up by the operating system kernel 12 and kernel extensions to take whatever action is necessary to respond to the occurrence of an interrupt. Next, scheduler 36 is depicted. Scheduler 36 orders specific tasks for dispatch to the processor upon indication that a task has the status "ready to run". Good design of the scheduling algorithm provides both effective use of central processing unit 16 by the various tasks and smooth response to user requests of data processing system 10.

Operating system 12 supports the emulation of a virtual DOS machine 24. Virtual DOS machine 24 in turn provides an operating environment for running DOS compatible application programs 22. Virtual DOS machine 24 includes a virtual DOS machine manager 38, a processor emulation routine 40 which preferably emulates an Intel 8086 microprocessor, DOS emulation 42, and a virtual device helper service 44 provided by the virtual DOS machine manager. Processor emulation 40 provides routing services for traps caused by application 22 interrupts and accesses to virtual device driver 46, allowing the latter to be emulated correctly. Virtual device drivers 46 can utilize physical device drivers directly generated by operating system 12 to access hardware through input/output adaptors 48.

Virtual DOS machine manager 38 creates, terminates and controls a virtual DOS machine 24. Virtual DOS machine 24 creation occurs upon manager 38 calling operating system 12 to create a process and initialization of the components described above. Virtual DOS machine 24 termination occurs when the application running on the machine is discontinued, or when the user orders its termination. Control of operations of the virtual DOS machine manager 38 relate in part to activities engaged in when operating system 12 notifies the manager that the window in which it is displayed has become active. At such times the Virtual DOS machine manager 38 notifies virtual device drivers 46 for the mouse, keyboard and video monitor of the computer system to reset virtual device to real device mappings. Virtual interrupt management 50 emulates operating system interrupt management.

Figure 2:
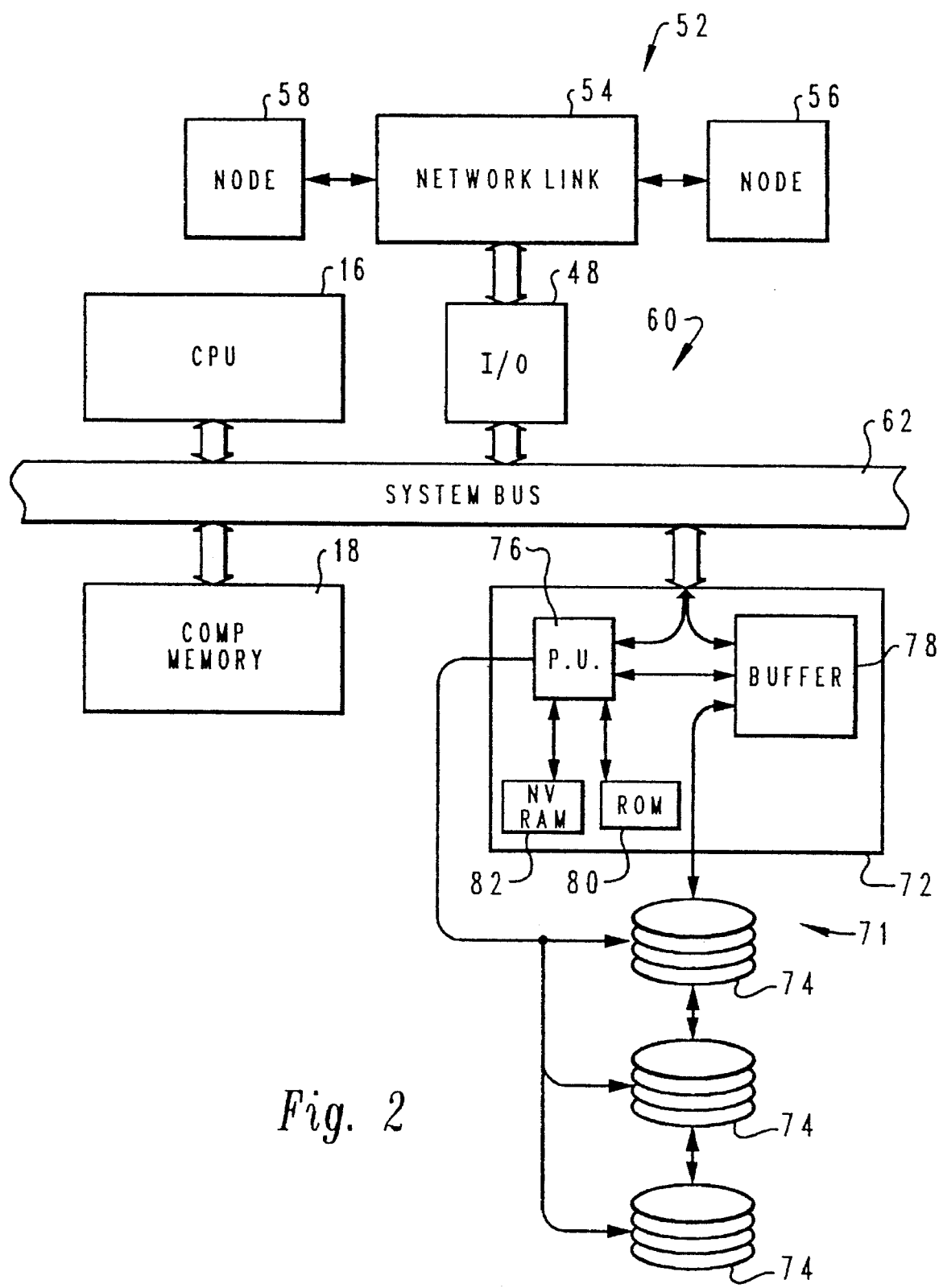
FIG. 2 a block diagram of a file server with an auxiliary storage device for a computer network.

FIG. 2 depicts a local area network 52 in block diagram. Network 52 includes a plurality of nodes 56, 58 and 60 communicating over a network link 54. Node 60 serves as a file server. Within file server node 60 a bus 62 provides communication of data, addresses and commands between a CPU 16, computer memory 18, a network I/O adaptor 48 and a storage controller 72, which is a type of I/O adaptor. An auxiliary storage device 71 comprises a plurality of disk drives 74 under the control of storage controller 72.

Storage controller 72 handles the interface for data transfer between disk drives 74 and the other devices connected to system bus 62. Conventionally, device controller 72 includes buffer 78 for temporarily holding data in transit between memory 18 and disk drives 74. Buffer 78 is controlled by a processor unit 76. Processor unit may be initialized upon system power up, or it may have access to a small read only memory (ROM) 80 and a small non-volatile random access memory (NVRAM) 82. ROM 80 holds a program executable on processor unit 76.

Figure 3:
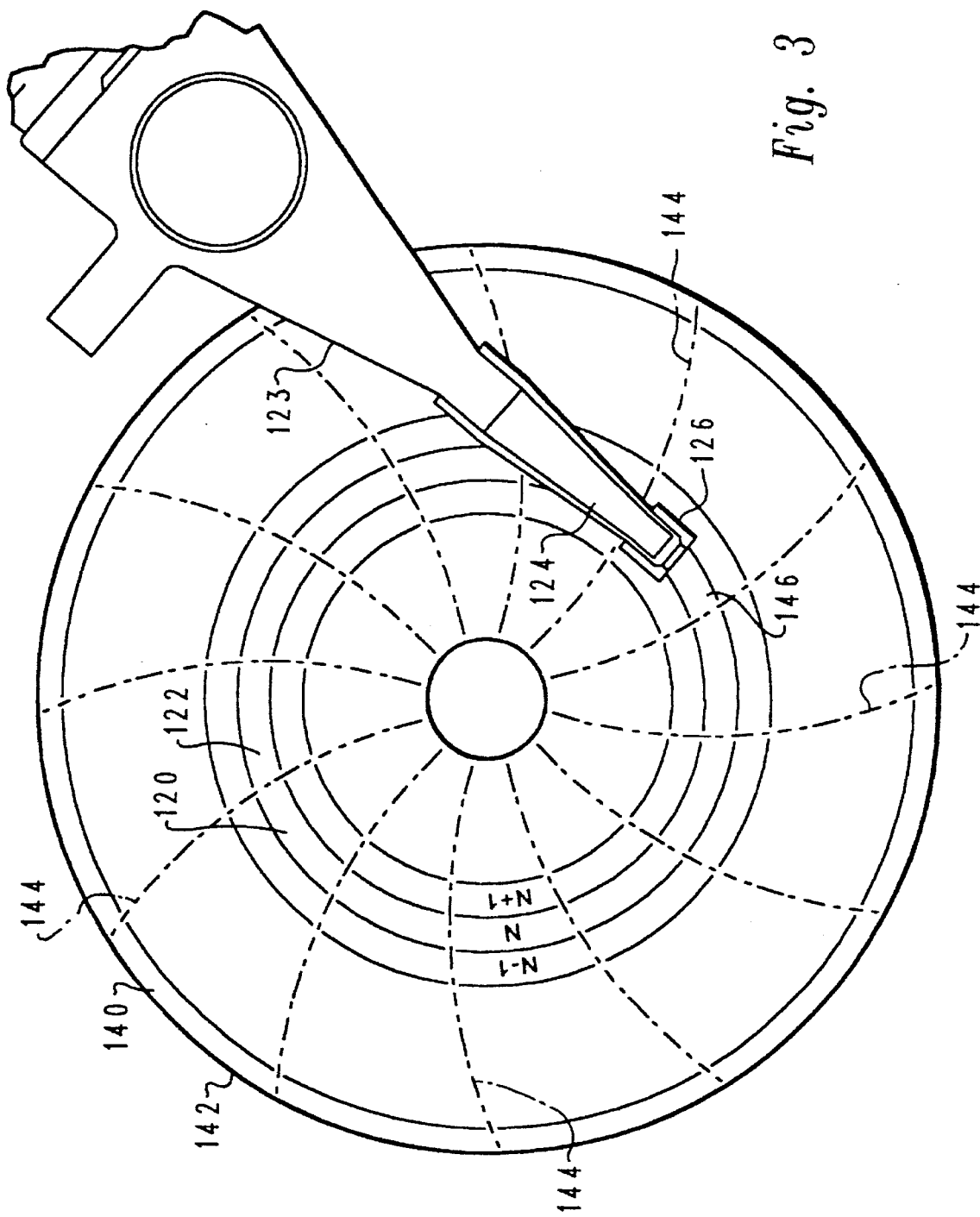
FIG. 3 is a view in top plan of a disk drive.

FIG. 3 illustrates positioning of slider 126 by an arm 123 over one of a plurality of tracks (1 to N+1) on a magnetic surface of 140 of a disk 142 as may be provided within one of disk drives 74. Each track is divided into sectors by a plurality of track servo fields 144 extending radially from the center of disk 140. Track servo fields curve to conform to the travel of slider 126 at the end of rotatable arm 123. If disk rotational speed is constant, a transducer mounted to slider 126 encounters a track servo field 144 at strict intervals of times. If a linearly actuated armature is used, track servo fields 144 are straight. Tracking information is derived from servo fields 144 in a manner well known in the art. Slider 126 is shown following track N, positioned over a sector 146. Sectors 120 and 122 are shaded to indicate the location of permanent critical sectors of the HPFS386 file system. Other objects of the HPFS386 may be located in any unreserved sector. Although 12 sectors are depicted, there are typically hundreds of sectors on a disk.

Figure 4:
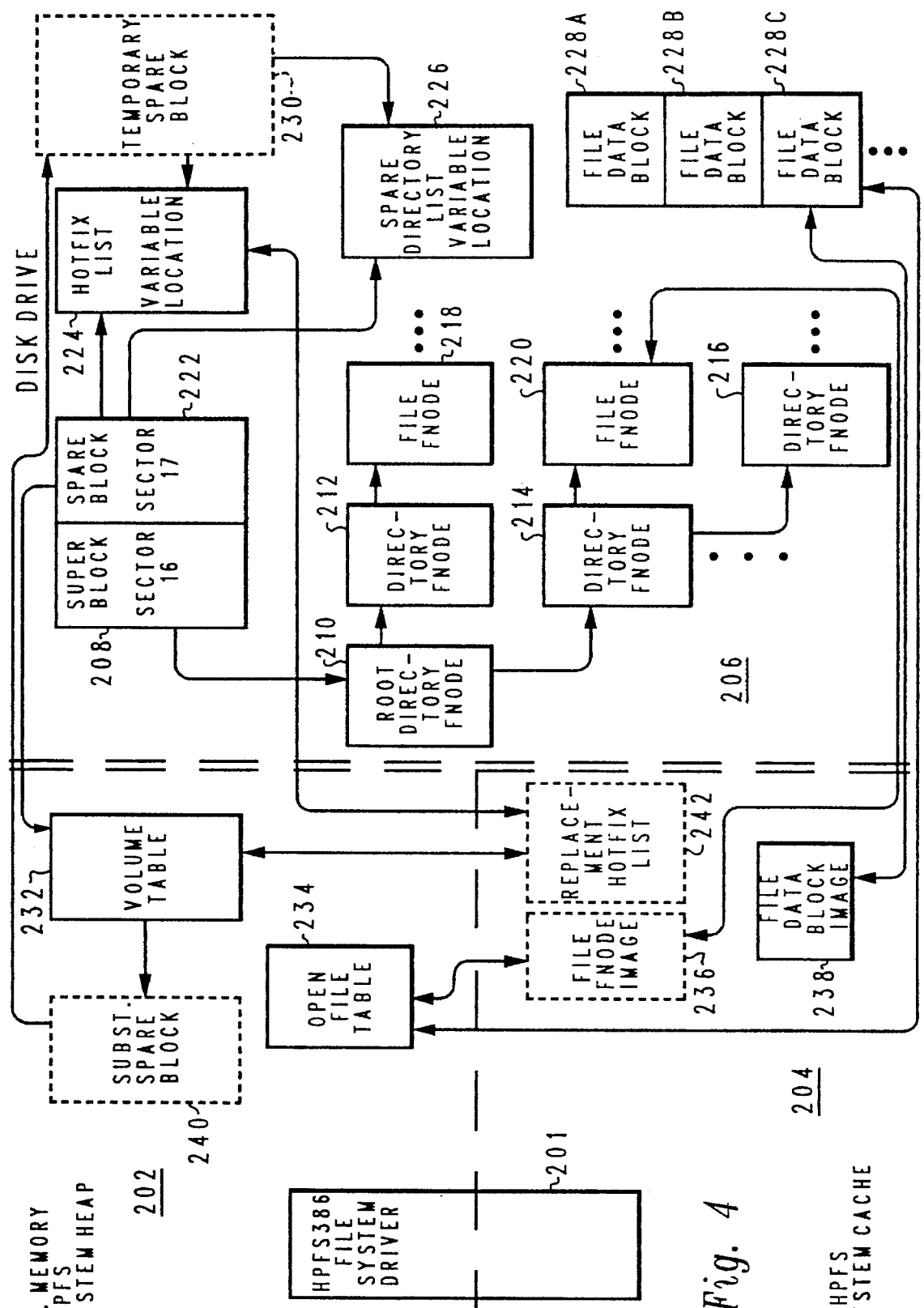
FIG. 4 is a map of the locations and interrelationships of a plurality of control structures and data records for a file system.

Every disk format requires that certain sectors be reserved for anchoring the rest of the file system structures on disk. These sectors are vital to the file system driver because without them the driver would not be able to provide file access to applications. FIG. 4 illustrates the disk format used in HPFS. The HPFS format is representative of a type of formats that does not provide for replication of critical sectors in order in enhance performance. The location and relationship of various objects and control structures of the HPFS386 file system as modified in light of the teachings of the invention are shown. A portion of computer or file server main memory is set aside for file system use. A file system cache 204 is a space of predefined size which is reserved for use of the file system. File system heap 202 varies in size as a function of demand for space by the structures created in it. A disk drive which is mapped by the file system provides a non-volatile space 206.

HPFS386 file system driver 201 spans heap 202 and cache 204. HPFS386 file system driver 201 is an OS/2 operating system installable file system driver. It is packaged with the IBM OS/2 LAN Server product. It is installed as a substitute for OS/2's HPFS file system driver. HPFS386 file system driver 201 interfaces to operating system kernel 12 for kernel services (e.g. allocation of system memory for the file system heap). HPFS386 file system driver 201 also interfaces to the OS/2 operating system disk subsystem to access sectors on physical disks. As a file system driver, HPFS386 receives requests from the OS/2 installable file system (IFS) router to access file and directory contents on disk. These requests are made by the IFS router on behalf of application requests to open or otherwise modify files.

The records stored in non-volatile space 206 normally survive shut down of a computer and thus are present upon initial program load of the computer. First among these records is a control structure termed the Superblock 208, which by convention is always located in the same sector and which contains a pointer to a root directory FNODE 210. Root directory FNODE 210 underlies a multi-level, tree directory structure including a plurality of directory FNODEs 212, 214 and 216, and a plurality of file FNODEs 218 and 220. The directory structure is conventional and the FNODES may be located in any unreserved sector of non-volatile space 206.

Also located in non-volatile space 206 is a Spareblock 222, which is permanently located at sector 17 in a disk drive owned by the HPFS. Spareblock 222 includes pointers to a conventional HotFix List 224 and to a conventional spare directory block (SpareDirBlk) 226. HotFix List 224 and Spare Directory Block 226 may be located anywhere in the unreserved portions of non-volatile space 206. A temporary Spareblock 230 may also be located in non-volatile space.

Temporary Spareblock 230 exists only under conditions where a failure in an access attempt to Spareblock 222 has occurred. In the preferred embodiment, access to temporary Spareblock 230 is not available upon an initial program load and the temporary Spareblock is intended to support operation of the file system for purposes of backing up the substantive portions of the directory structure, i.e. the FNODEs and file data blocks 228A–C.

Upon an initial program load or other file system initialization for a computer system, access is had to the Spareblock. The Spareblock includes pointers and information regarding the state of the file system upon prior shutdown of the disk drive, including whether images of the files in system memory were potentially inconsistent with data records of the files on the disk drive. An abnormal or uncontrolled shutdown of the disk drive after manipulation of files is assumed to result such inconsistency. An image of the Spareblock is generated in a computer system memory to support operation of the file system and the user is told of the possible incoherent condition of file data records. Conventional file system operations may then commence. Responsive to manipulation of files, the Spareblock on disk is marked for incoherent data file records. This marking is removed as part of a normal shutdown procedure.

The Spareblock also includes values for certain critical operating variables. Robustness of the file system is enhanced by providing for regeneration of the Spareblock in case of loss of access to it. Selected fields for the Spareblock are maintained in a volume table in system memory. If an access to the Spareblock fails, a new sector is allocated. An image of the Spareblock is generated from the volume table and recorded in the newly allocated sector for use in backing up the disk drive prior to a subsequent initial program load.

Among the critical variables kept in the Spareblock is information about a control block called the HotFix List, which is used to substitute good sectors for bad sectors on the disk drive. The contents of the HotFix List are also kept in the volume table and may be replaced from the volume table if access to the HotFix List ever fails.

The process just described is now related to FIG. 4. Attendant to an initial program load, or other occurrence of file system initialization time, several file system control structures are built in computer memory 18. Portions of Spareblock 222 are read into a volume table 232 which is opened in file system heap 202. Volume table 232 may then be referred to locate HotFix List 224 which in turn is added to the volume table. The volume table also includes a field for a Spareblock address, which initially is set for the fixed location for Spareblock 222.

Upon opening of a file a number of data and control structures are generated in file system heap 202 and in file system cache 204. A full description of the processes for accessing, creating and destroying files is omitted as being well known to those skilled in the art. Any file which has been accessed will have an associated control structure called an open file table (OFT) 234 in file system heap 202. OFT 234 corresponds substantially in content to a file FNODE. A file exists if a block of data has been named, which occurs typically upon an initial save by a user or an application of the data to non-volatile space 206.

In networks or on stand alone computers, a feature called lazy write may be in use. Although updates of the Spareblock and HotFix List must be synchronous, update of other records on disk may be postponed. A logical save, i.e. creation of a file, may be spaced in time by writing of a physical record. Creation of a file, or directory, results in immediate generation of an OFT followed by eventual writing of an FNODE on the disk. If the file preexists and is now being accessed, its file FNODE, for example file FNODE 220, is read into file system cache 204 to produce an FNODE image 236. The contents of FNODE image 236 are used to generate OFT 234, after which the space occupied by FNODE image 236 in cache 204 is released. File FNODEs identify the location of data blocks for the file in non-volatile space 206. This data is available in Open File Table 234, and is used to read an appropriate record or file data block 228C into a region 238 in file system cache 204 and eventual use by an application program through the file system.

Upon closing a file the process is partially reversed if any changes to the file are to be saved. FNODE image 236 is reopened to receive updates in the form of pointers to blocks 228 from OFT 234. The contents of region 238 are written back into block 228C, and any additional blocks 228 required to hold the data. FNODE image 236 is written over file FNODE 220.

In part the invention concerns maintaining file system operation where access to Spareblock 222 or HotFix List 224 has failed. HotFix List 224 is critical to system operation because of its list of available good sectors and its map of substituted sectors of disk locations for records 228 and FNODEs. Spareblock 222 is the repository of such critical information as the location of HotFix List 224 and Spare Directory List 226. Upon a failure of access to Spareblock 222, the HPFS generates a substitute Spareblock 240 in file system heap 202. A reserved memory space of 512 bytes is provided for this purpose. The reserved memory space is static within the system. Once generated, substitute Spareblock 240 is stored as temporary Spareblock 230 in non-volatile space 206. The location of temporary Spareblock 230 in non-volatile space 206 is placed in volume table 232. Similarly, HotFix List 224 may become inaccessible. If it does, a replacement HotFix List 242 is constructed in file system cache 204 from the contents of volume table 232 and then written to a newly allocated location in non-volatile space 206 as the new HotFix List 224.

FIGS. 5A–5B list the fields in the Spareblock and volume table of the previous figure. FIG. 5A illustrates the contents of the Spareblock, which has fields for: a record signature; a cleanliness or incoherency flag (SPB flag); a pointer to the HotFix List; a count of the number of HotFixes in effect; a maximum size parameter for the HotFix List; a pointer to the SpareDirBlk; and a counter of the number of directory FNODEs in the SpareDirBlk. The SPB flag indicates if the disk drive in use underwent an abnormal shut down prior to the present initial program load. Changes relating the HotFix List, the SPB flag, or the SpareDirBlk are dynamically made.

FIG. 5B is of volume table 232, which has fields for: the SPB flag; a pointer to the HotFix List; a count of the HotFixes in effect; the maximum number of allowed HotFixes; a pointer to the SpareDirBlk; a sector location for the Spareblock; a pointer to the Root Directory FNODE obtained from the Superblock; and a copy of the HotFix List.

Figure 6A:
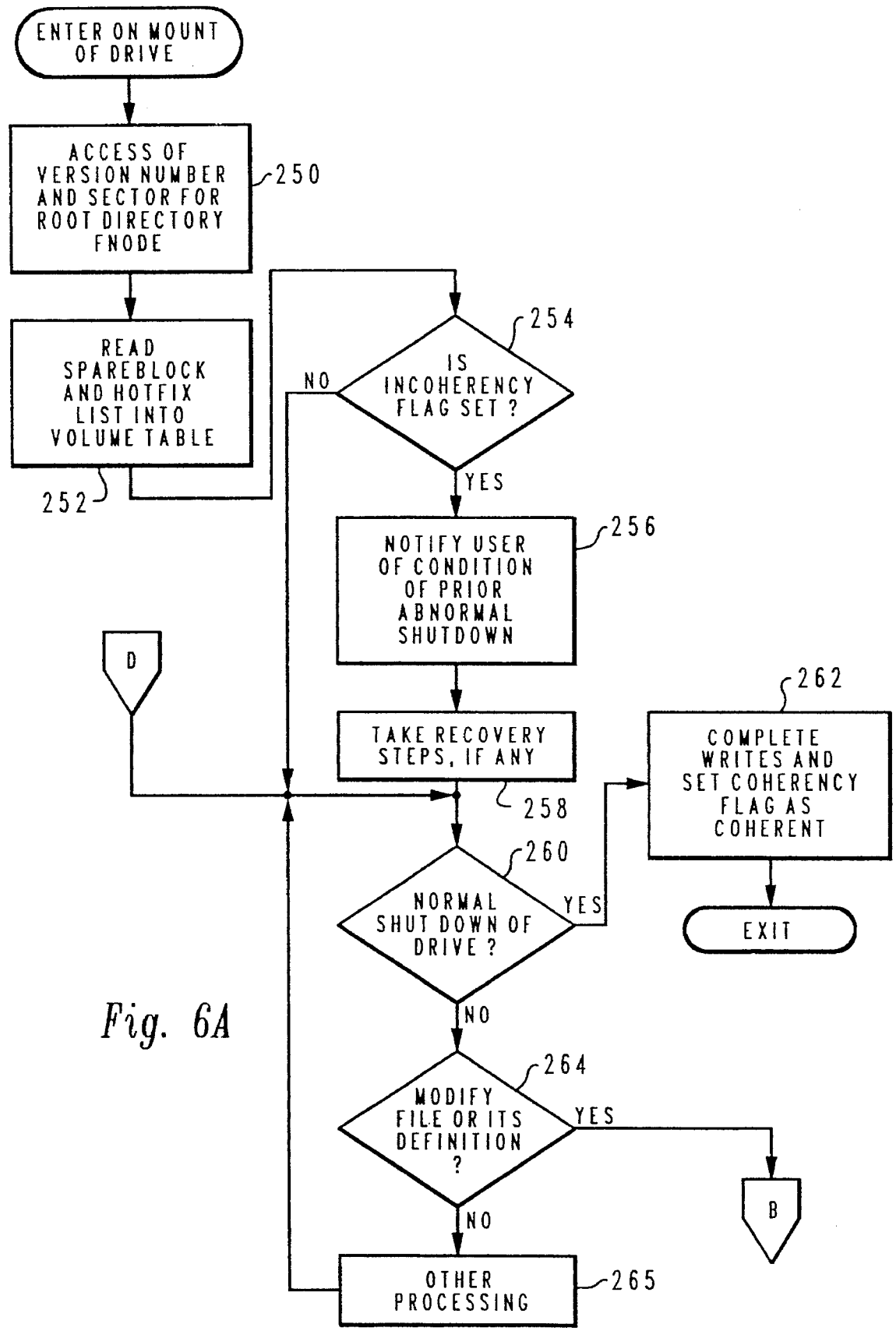
FIGS. 6A and 6B are a logical flow chart of a process for implementing backup features for a file system.
Figure 6B:
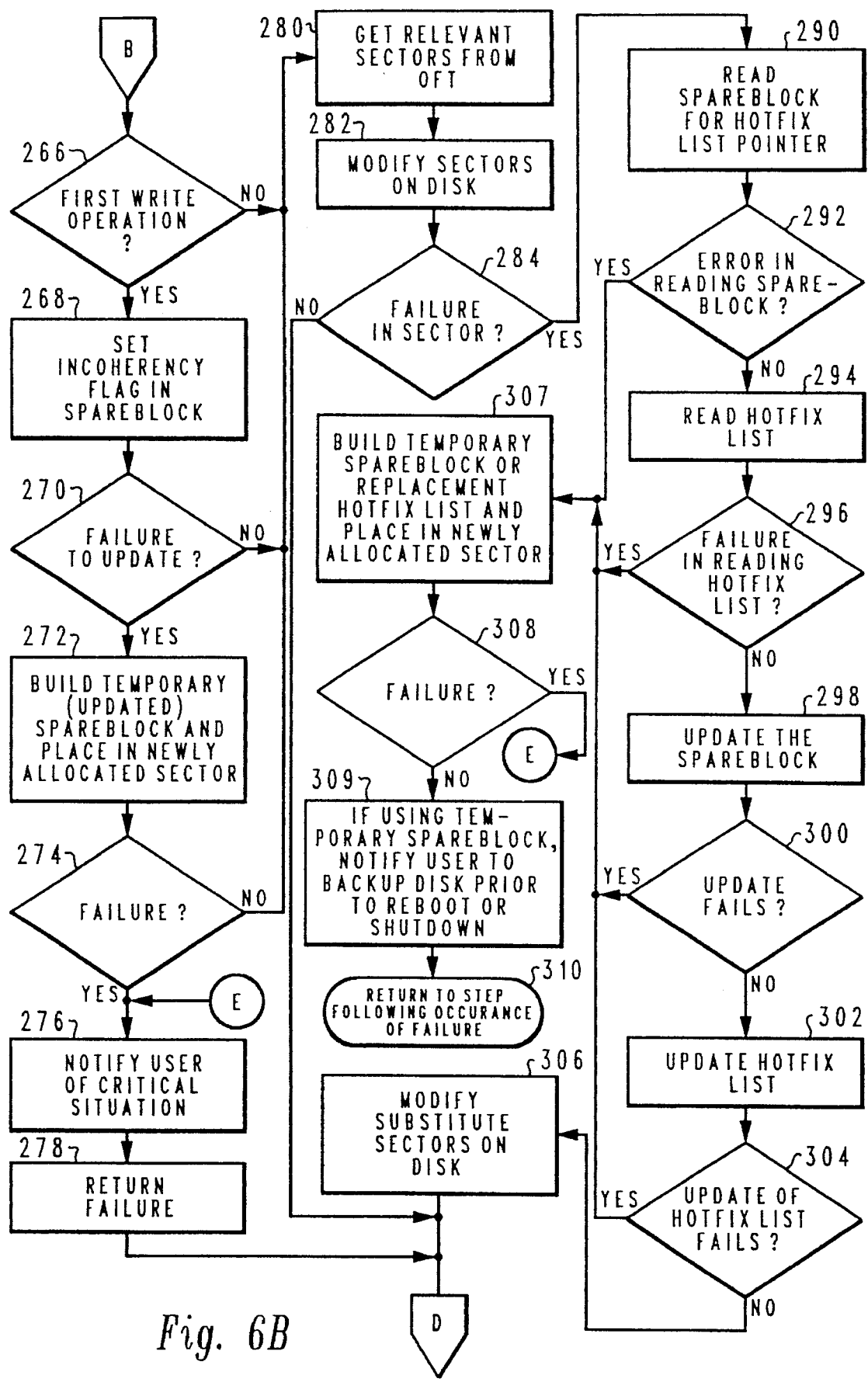

In disk formats that do not provide for critical sector replication, robustness and file data access are provided through the dynamic regeneration of these critical sectors. When access to one of the dynamic critical sectors fails, an image of the sector is created in memory and then written to disk at a location different from the original. Also, all pointers to the original sector are redirected to the location the alternate critical sector. FIGS. 6A and 6B are high level logical flow charts for the process executed by the HPFS386 file system driver in accordance with the present invention.

The process is entered upon mount of a drive. At step 250 an access of the version number and sector for root directory FNODE from the Superblock is made. The location of the root directory FNODE may be added to a file structure table or similar structure for use of search routines which are provided by the file system but not described here. At step 252 the Spareblock and Hotfix list are read into the volume table. Next, at step 254 the SPB flag is examined to determine if it is set for coherency or incoherency. If incoherency is indicated the YES branch is taken from step 254 to step 256. Step 256 notifies a user of a condition of a prior abnormal shutdown of the disk drive and the possible consequential incoherency of the records on the disk drive. Step 258 may follow step 256 if some recovery steps are deemed expedient by the user or are automatically provided.

The disk drive is now ready to respond to normal commands by a user. At step 260 it is determined if a normal shutdown of the drive is indicated. The HPFS is commonly used on computers which serve as file servers or a local area network. In local area networks a feature known as "lazy write" may be provided which accepts commands for manipulation of a file from a user, and indicates those commands as completed, when in fact the file server is holding the manipulated file in memory with the object of completing writing of the file to the disk drive at a later time as processor cycles become available. In case of a power loss during the period where the write has been indicated as complete to a user but before the write actually physically completes, the desired contents of a file and the actual physical contents of a file on disk are incoherent, i.e. they disagree. Upon a normal shutdown of a drive all outstanding writes are completed (step 262) and the SPB or incoherency flag is set as coherent. The process is then exited. The temporary Spareblock generation process of the invention may be executed as described below in case of failure to update the permanent Spareblock. If some command other than normal shutdown of a drive has been entered, the NO branch is followed from step 260 to steps 264 to determine if modification of a file or the definition of a file has been attempted. The NO branch from step 264 to step 265 indicates other processing that may occur and return of the process to step 260 via connector A. Following the YES branch from step 264 passes processing via connector B to step 266 of FIG. 6B.

In FIG. 6B, step 266 determines if the operation passed by step 264 is the first file modification (e.g. write) operation or file definition modification operation undertaken since mounting of the drive. If it is, the YES branch is taken to step 268, which is executed to update the incoherency flag in the Spareblock to indicate possible incoherency of the data structures in non-volatile space 206. A failure to update detected at decision step 270 indicates a problem with the critical sector in which the Spareblock resides. Following the YES branch from step 270, step 272 is executed to build a temporary Spareblock and to place the temporary Spareblock in a newly allocated sector on disk. The volume table is also updated to point to the temporary Spareblock. Step 274 then provides for detecting a failure to write the temporary Spareblock to a new sector. If a failure occurs, step 276 is executed to notify the user that a critical condition may exist with respect to the affected disk drive. A failure of the operation is returned to the pertinent application program and processing returns to step 260 via connector D.

Step 280 follows the NO branches from each of steps 266, 270 and 274. That is, the operation represented by the step is executed if no access to the Spareblock is required yet, or if the Spareblock or a temporary Spareblock is available. At step 280 the relevant sectors for the file (or file definition) to be modified are retrieved from the open file table (OFT) for the file. At step 282 the indication modifications are made to the sectors. Step 284 is executed to determine if the modifications were successfully made. A failure to make a modification indicates a bad sector and requires access to the HotFix list to substitute a good sector for the bad sector. Where no failure occurs the operation is completed normally. The NO branch is taken from step 284 to step 260 via connector D for another operation.

If an operation did not conclude normally, that is failure was detected at step 284, a HotFix is undertaken to substitute a good sector for the bad sector which caused the failure. Step 290 follows along the YES branch from step 284 and provides for reading the Spareblock to obtain the HotFix List pointer. The Spareblock is referred to because updates to the Spareblock and HotFix List are synchronous operations, not relying on the lazy write feature for completion. Error or absence of error in reading the Spareblock is determined at step 292. If no error occurs, the HotFix can continue along the NO branch from step 292. Step 292 is executed to read the HotFix List. Step 296 then determines is an error occurred in reading the HotFix List. No error allows processing to proceed to step 298 where the counter of HotFixes in effect in the Spareblock is updated. Again, failure to access the Spareblock is provided for by providing step 300 to monitor success or failure of the update of the Spareblock. The NO branch from step 300 is taken to step 302 if the update is successful. At step 302 the HotFix List is updated. Step 304 provides for determining if the update of the HotFix List failed. If the update succeeded, step 306 is executed to modify the substitute sectors and processing is returned to step 260 via connector D.

As an alternative to regenerating a transient, alternate sector, is to regenerate a permanent, alternate sector(s), the signature for which is searched for upon the next remount.

Indication of failure at any of decision steps 292, 296, 300 and 304 invokes replacement operations for the HotFix List or the Spareblock, depending upon which was not accessed. Step 306 provides for building a temporary Spareblock, or a replacement HotFix List, whichever is needed, from the volume table and for placing the structure into a newly allocated sector on the disk. Failure or success of the operation is detected at step 308. If successful, step 309 may be executed if a temporary Spareblock is now in use. Step 309 provides for notifying a user that a temporary Spareblock is in use to allow the user to back up the disk before remount of the effected disk drive. Following step 309 processing is returned to the step following on the NO branch from the decision step where the error was detected. If the process was unable to replace the Spareblock or HotFix List, processing continues at step 276 as described above. The system remains operational even though replacement of the HotFix List or the Spareblock fails.

The invention provides for maintaining full operation of a disk drive volume notwithstanding inaccessibility of the Spareblock or HotFix List. This is done without maintaining redundant copies of either data structure on the disk drive. The invention should reduce the frequency of generation of internal processing error (IPE) with the consequence that fewer system crashes will occur on systems using HPFS386 file system driver. The possibility of loss of power of one drive in an array of drives under a controller for a file server is not an unrealistic scenario. The invention provides for avoiding generation of internal processing errors under such conditions.

While the invention has been particularly shown and described with reference to a preferred embodiment, it will be understood by those skilled in the art that various changes in form and detail may be made therein without departing from the spirit and scope of the invention.

What is claimed is:

1. A file system for mapping files to a non-volatile auxiliary storage in a data processing system having a system memory, the file system comprising:

a plurality of file blocks within said file system wherein only selected file blocks within said plurality of file blocks are designated as critical blocks and wherein replication of critical blocks within said file system is prohibited;

means for identifying a file block stored at a predetermined sector of the non-volatile auxiliary storage as a first critical block, the first critical block having a plurality of fields;

means for generating a volume table in the system memory including an image of at least some of the fields of the first critical block in response to said identification; and means responsive to a later failure of said file system to access the critical block for generating a replacement image within said file system of at least some of the fields of the first critical block utilizing said image within the system memory wherein said file system remains fully operational.

2. A file system as set forth in claim 1, and further comprising:

a second critical block stored on the non-volatile auxiliary storage containing a substitution map of good sectors of the non-volatile auxiliary storage available for substitution of bad sectors of the non-volatile auxiliary storage; and the first critical block including a field for a substitution map pointer to the substitution map.

3. A file system as set forth in claim 1, and further comprising:

means for making a substitution record utilizing the replacement image and placing the substitution record in non-volatile auxiliary storage.

4. A file system as set forth in claim 3, wherein the volume table includes a field for a sector pointer to the predetermined sector and further comprising means for resetting the sector pointer to point to a sector for the substitution record.

5. A file system as set forth in claim 4, wherein the non-volatile auxiliary storage is a disk drive having a plurality of sectors for placing records.

6. A file system as set forth in claim 5, and further comprising:

an incoherency flag in the critical block for indicating if potentially inconsistent data file records simultaneously existed in the non-volatile auxiliary storage and data file images in the system memory at the time of a prior at normal shutdown of the non-volatile auxiliary storage;

means responsive to manipulation of a file for setting the incoherency flag to a value indicating an incoherent condition;

means responsive to a controlled shutdown of the non-volatile auxiliary storage for overwriting data records in the non-volatile auxiliary storage for all files which have been manipulated and setting the incoherency flag to a value indicating a coherent condition; and means responsive to file system initialization for reading the incoherency flag and indicating to a user the incoherent condition.

7. A file system as set forth in claim 2, and further comprising:

means responsive to file system initialization for reading an image of the substitution map into the volume table; and means responsive to a failure to access the substitution map for generating a replacement substitution map, recording the replacement substitution map at a location in the non-volatile auxiliary storage and changing the value of the substitution map pointer to the location of replacement substitution map.

8. A file system as set forth in claim 2, and further comprising:

means for making a substitution record utilizing the replacement image and placing the substitution record in the non-volatile auxiliary storage.

9. A file system as set forth in claim 8, wherein the volume table includes a field for a sector pointer to the predetermined sector and further comprising means for resetting the sector pointer to point to a sector for the substitution record.

10. A file system as set forth in claim 9, wherein the non-volatile auxiliary storage is a disk drive having a plurality of sectors for placing records.

11. A file system as set forth in claim 10, and further comprising:

an incoherency flag in the critical block for indicating if potentially inconsistent data file records simultaneously existed in the disk drive and data file images in the system memory at the time of a prior at normal shutdown of the disk drive;

means responsive to manipulation of a file for setting the incoherency flag to a value indicating an incoherent condition;

means responsive to a controlled shutdown of the disk drive for overwriting data records in the disk drive for all files which have been manipulated and setting the incoherency flag to a value indicating a coherent condition; and means responsive to the initial program load for reading the incoherency flag and indicating to a user the incoherent condition.

12. A file system as set forth in claim 10, and further comprising:

means responsive to the file system initialization for reading an image of the substitution map into the volume table; and means responsive to a failure to access the substitution map for generating a replacement substitution map, recording the replacement substitution map in the disk drive and changing the value of the pointer to the replacement substitution map.

13. A file system as set forth in claim 12, and further comprising:

an incoherency flag in the critical block for indicating if potentially inconsistent data file records simultaneously existed in the disk drive and data file images in the system memory at the time of a prior non-normal shutdown of the disk drive;

means responsive to manipulation of a file for setting the incoherency flag to a value indicating an incoherent condition;

means responsive to a controlled shutdown of the disk drive for overwriting data records in the disk drive for all files which have been manipulated and setting the incoherency flag to a value indicating a coherent condition; and means responsive to the initial program load for reading the incoherency flag and indicating to a user the incoherent condition.

14. A file system as set forth in claim 13, wherein the data processing system provides a lazy write feature.

15. A method of managing a file system on a data processing system, comprising the steps of:

identifying a plurality of file blocks within said file system wherein only selected file blocks within said plurality of file blocks are designated as dynamic critical blocks and wherein replication of dynamic critical blocks within said file system is prohibited;

constructing a volume table in a computer main memory including selected contents of a block stored within non-volatile storage in response to an identification of said block as a dynamic critical block;

responsive to a later failure of said file system to access the dynamic critical block within the non-volatile storage, building a replacement dynamic critical block utilizing the volume table;

allocating a location in the file system to the replacement dynamic critical block; and recording the replacement dynamic critical block at the allocated location within said file system wherein said file system remains fully operational.

16. A method as set forth in claim 15, and further comprising:

responsive to failure to record the replacement dynamic critical block, notifying a user of a system failure; and responsive to success in recording the replacement dynamic critical block, notifying the user of a possible disk failure.

17. A method as set forth in claim 16, and further comprising;

placing an indicator of coherency or incoherency for file data records of the non-volatile storage in the dynamic critical block;

responsive to file system initialization, accessing the dynamic critical block to determine possible incoherency of the file data records;

responsive to indication of incoherency of the file data records, indicating the possible incoherency to the user;

responsive to modification of data for a file, setting the indicator to a condition of incoherence; and responsive to a normal shutdown of the non-volatile storage, setting the indicator to a condition of coherence.

18. A method as set forth in claim 16, and further comprising:

recording a substitution map in the non-volatile storage;

placing a pointer to the substitution map in the dynamic critical block;

responsive to the initial program load, reading the contents of the substitution map into the volume table;

responsive to a later failure to access the substitution map, constructing an alternate substitution map from the volume table and recording the alternate substitution map at a newly allocated location in the non-volatile storage; and changing the pointer to the substitution map point to the alternate substitution map.

19. A method as set forth in claim 15, and further comprising:

responsive to failure to access the dynamic critical block upon file system initialization, searching the non-volatile storage for a signature of the replacement dynamic critical block.

20. A local area network comprising:

a plurality of disk drives;

a file server for controlling the plurality of disk drives, the file server supporting lazy writes of files to the plurality of disk drives;

the file server having a central processor and a memory for executing a file system for controlling mapping of files to at least a first disk drive from the plurality of disk drives;

a control block for the file system recorded at a predetermined sector of the first disk drive;

means for constructing a volume table in a computer main memory including selected contents of the control block;

means responsive to a later failure to access the control block for building a replacement control block from the volume table;

means for allocating a location on the first drive to the replacement control block; and means for recording the replacement control block at the allocated location.

21. A local area network as set forth in claim 20, and further comprising:

means responsive to failure to record the replacement control block for signalling a user of a system failure; and means responsive to success in recording the replacement control block for notifying a user of a possible disk failure.

22. A local area network as set forth in claim 21, and further comprising;

means for placing an indicator of coherency or incoherency for file data records of the disk drive in the control block;

means responsive to file system initialization for accessing the control block to determine possible incoherency of the file data records;

means responsive to indication of incoherency of the file data records for indicating the possible incoherency to the user;

means responsive to modification of data for a file for setting the indicator to a condition of incoherence; and means responsive to a normal shutdown of the disk drive for setting the indicator to a condition of coherence.

23. A local area network as set forth in claim 20, and further comprising:

means for recording a substitution map on the disk drive;

means for placing a pointer to the substitution map in the control block;

means responsive to the initial program load for reading the contents of the substitution map into the volume table;

means responsive to a later failure to access the substitution map for constructing an alternate substitution map from the volume table and for recording the alternate substitution map at a newly allocated location on the disk drive; and means for changing the pointer to the substitution map point to the alternate substitution map.

24. A local area network as set forth in claim 21, wherein the control block is a temporary control block recorded at a different sector than the predetermined sector.

25. A local area network as set forth in claim 21, wherein the replacement control block is permanently located upon file system initialization and located by searching the disk drive for a signature.

26. A local area network as set forth in claim 25, wherein the file system does not permit concurrent duplicate copies of control structures on the disk drive.

* * * * *